United States Patent Office 3,455,511
Patented July 15, 1969

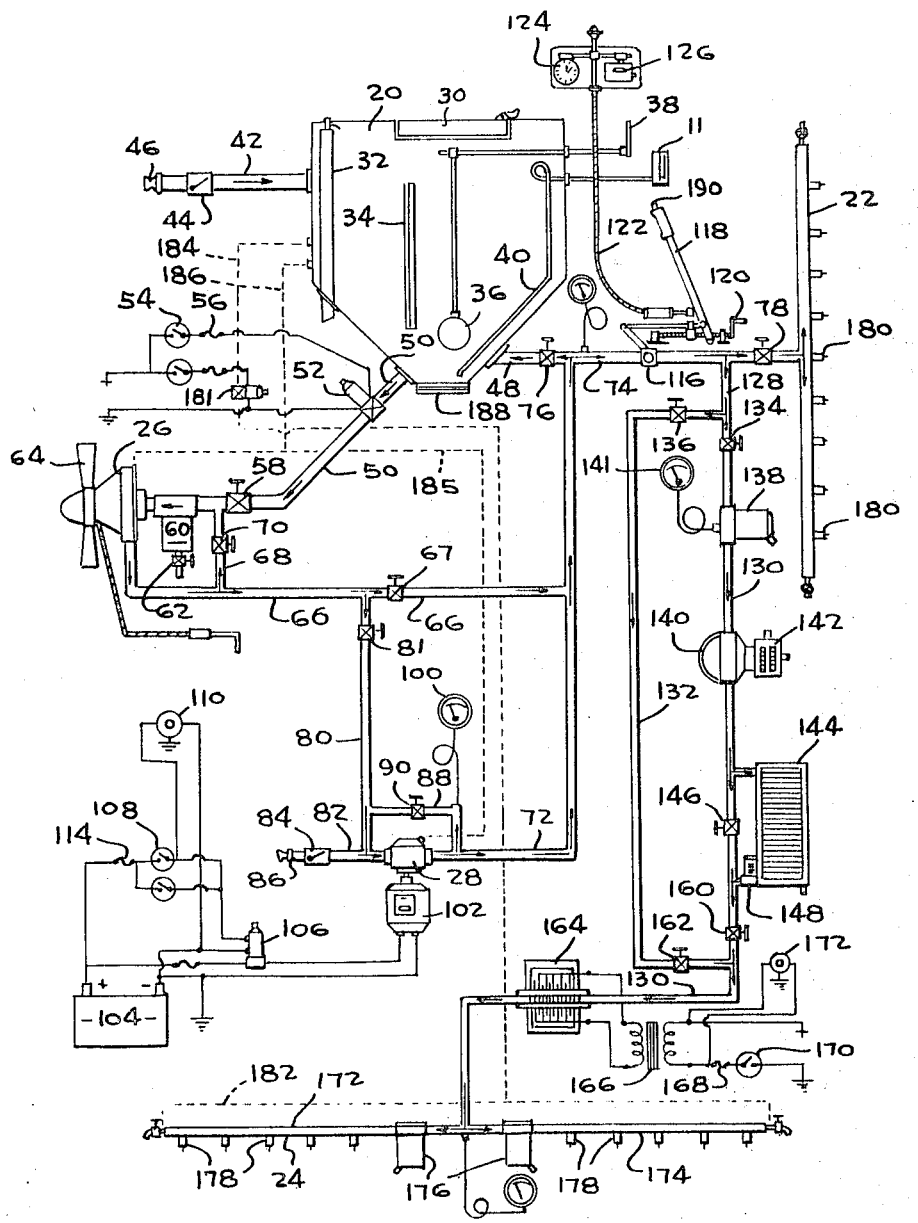

3,455,511
AIRCRAFT MOUNTED SPRAYING SYSTEM
Alejandro Fedorenko Fedorenko, López Cotilla 331–1,
Guadalajara, Jalisco, Mexico
Filed Aug. 1, 1967, Ser. No. 657,591
Int. Cl. B64d 1/18; B05b 17/02, 5/02
U.S. Cl. 239—171                                        8 Claims

ABSTRACT OF THE DISCLOSURE

An aircraft mounted chemical mixing and control system having two selectively operable spray discharge manifolds with first and second pump systems, valving, cooling and filtering elements for enabling multiple modes of operation.

Background of the invention

This invention relates to the field of liquid spraying and, more particularly, relates to an aircraft mounted crop spraying system.

Aircraft mounted spraying systems for treating crops or other surface areas have long been employed. However, the previously known systems have suffered from numerous deficiencies which have proven to be extremely detrimental in terms of cost of operation and effectiveness of operation.

The advances of scientific knowledge in the field of chemistry have resulted in many new chemical substances that are applied in extremely concentrated form as compared to the earlier powders and diluted liquids which were originally employed for pesticide treatment by aircraft deposition. However, the tremendous advances of the chemical industry in providing new highly concentrated pesticides has created many serious problems for those desiring to deposit such new products from an aircraft spraying system. This is true because the prior devices are not capable of the preciseness of operation required for using highly concentrated spray chemicals.

One of the main problems encountered in aircraft spraying system is that the chemicals employed are subjected to heating during operation of the aircraft. This heating is created by the recirculation of the chemicals by the pressurizing pump empolyed for pressurizing the system which is normally continually operated with the deposition of the chemicals being controlled by the opening of a throttle or control valve. When the control valve is closed, the chemicals are recirculated and consequently, absorb a considerable amount of heat. When liquids such as this are heated, bubble formation often occurs in the system which creates cavitation problems in pumping so as to greatly lower the efficiency of the system. Moreover, the presence of bubbles within the system is highly detrimental when the chemicals are being applied in that such bubbles cause an erratic application of the spray so that a nonuniform application to the crop or area being treated is resultant.

Another serious problem created by the overheating of the spray chemicals is that such overheating causes certain chemicals to chemically change their composition so that their effectiveness for their intended purpose is lost.

Yet another problem arising from excessive temperature of the chemical is that a large amount of the chemical evaporates when sprayed from the aircraft spraying system and is consequently not deposited upon the desired crop area. Moreover, the high temperature of the chemicals also creates problems under certain weather conditions in which the chemicals sprayed from the aircraft are lighter than their surrounding environment and consequently move upward in a vertical direction rather than downward for deposition upon the desired crop area.

Another problem inherent from the use of highly concentrated chemicals is the fact that a high degree of accuracy must be inherent in the amount of chemical applied per square area of crop or soil surface. Consequently, it is necessary that the chemical applying apparatus include highly accurate control systems for controlling the flow of chemical.

Still another problem arising from the use of highly concentrated chemicals is the danger of the operating personnel becoming poisoned or injured by the sometimes highly toxic chemicals. This makes it highly desirable that the operating personnel never need come into contact with the chemicals and that such can be loaded into the aircraft without the necessity of manual floating or other operations which inherently involve contact with the chemicals or their vapors.

Summary of the invention

This invention overcomes the deficiencies of the aforediscussed prior art systems through the provision of a chemical storage reservoir having outlets connected to first and second distinctive pump means. The first pump is driven by a slip-stream driven propeller mounted outside the aircraft and the second pump is driven by the electrical system of the aircraft. Two spray discharge manifolds having a plurality of spray heads along their length are employed and are selectively operable for discharging various volumes of spray in accordance with the nature of the chemicals and crops involved in each particular spray operation. A cooling radiator is provided for cooling the spray chemicals prior to discharge when such action is necessary. Multiple filters are employed for use when the system is used in depositing a very low volume in order that all foreign matter can be filtered from the chemicals so that a spray of approximately ten microns particle average is achieved. Valving and associated fluid connector lines are provided to allow either spray manifold to be connected to either pump in accordance with the desired volume of flow. Quick release means is incorporated in the chemical storage tank for releasing the entire supply of chemicals in approximately five seconds in case of an aircraft emergency. A storage system is designed so that the entire amount of chemical is not discharged instantaneously to cause a rapid veering movement of the aircraft which often results in the pilot's being rendered unconscious.

Still another problem inherent in the presently known equipment is that it lacks versatility in permitting the use of varying pressures for varying spray conditions. It is impossible, therefore, to vary the volume and/or pressure of spraying for different job applications.

Other deficiencies of the present day equipment resides in the fact that the spray particles, at the exiting from the airplane, tend to merge and create droplets of larger than desired size. Consequently, uniform application is not achieved.

Therefore, it is a primary object of this invention to provide a new and unobvious spraying system for use on aircraft.

Yet another object of this invention is the provision of a new and unobvious spraying system of extreme versatility.

Still another object of this invention is the provision of a new and unobvious aircraft mounted spraying system having selectable variable volume output rates.

Yet another object of this invention is the provision of a new and unobvious aircraft mounted spraying system employing multiple pumping systems.

Still another object of the present invention is the provision of a new and unobvious spraying system incorporating particle charging means to reduce the tendency of the atomized droplets to merge with each other.

Brief description of the drawing

The drawing is a schematic circuit illustration of the preferred embodiment of the system forming this invention.

Description of the preferred embodiment

The preferred embodiment of the invention illustrated in the drawing can be mounted on any aircraft of suitable size and power. All control valves and other controls are within the reach of the pilot in his cockpit and the drawing illustrates the functional relationship of the separate elements of the invention.

The main elements of the system comprise a storage reservoir 20, a high volume spray discharge manifold 22, a low volume spray discharge manifold 24, a slip-stream driven centrifugal high pressure pump 26, and a low pressure electrically driven centrifugal pump 28.

Storage reservoir 20 is provided with a removable lid 30 which allows visual inspection of the reservoir interior and also allows manual filling of the reservoir if desired.

An overflow tube 32 is located on the interior of the reservoir 20 and allows for the overflow of excessive volume of chemicals such as it ofttimes caused by thermal expansion. A baffle 34 is positioned in a central location in the reservoir to reduce sloshing and liquid movement. The volme of fluid within reservoir 20 is indicated by a float 36 which actuates an indicator needle 38 located in the aircraft cockpit. A second pressure detector means 40 actuates a visual indicator 11 to indicate the volume of liquid remaining in the reservoir.

There are two ways other than manual filling through the opening covered by lid 30, in which the reservoir 20 can be filled. A first feed line 42 including a check valve 44 is connectable by a connector 46 to any storage system employing a pump or the line for supplying liquid to the reservoir. Liquid can also be introduced in the reservoir 20 by a second feed line 48 intering the bottom portion of the reservoir 20. The manner in which liquid is introduced to the reservoir 20 by means of the second feed line will become apparent hereinafter. A discharge line 50 is connected to the lower portion of the reservoir 20. An electrically operable valve 52 is incorporated in discharge line 50 and is operated by a switch 54. The system is protected by overload by a fuse 56. A manually operable valve 58 is also located in line 50 and a filter 60 has an output connected to the inlet of centrifugal pump 26. Filter 60 includes a drain 62 which enables periodic draining of the filter when desired.

High pressure pump 26 is driven by a propeller or fan 64 which is located on the exterior of the aircraft to be rotated by the movement of air past the aircraft during flying operation. Pump 26 includes an electrically operable brake for stopping the pump in case of emergency. The brake is conventional and is not illustrated in order to avoid needless complexity in the drawings.

The outlet from pump 26 is connected to a high pressure discharge line 66. A bypass line 68 incorporating a valve 70 connects lines 50 and 66. Valve 70 can be opened desired amounts to recirculate a given amount of fluid through pump 26 if desired.

High pressure discharge line 66 is connected to discharge into a distributor line 72 which in turn is connected to a main flow line 74 which is connected to the midportion of manifold 22. Line 74 is also connected by means of a vlave 76 to the second feed line 48. An isolating valve 78 is mounted in line 74 to completely cut off all flow in manifold 22 if desired. Distributor line 72 is also connected to the outlet of the low pressure pump 28. The inlet of pump 28 is connected to a diverter line 80 and is also connected by means of a secondary feed line 82 and a check valve 84 to a connector 86 to which a hose or the like is connected to form a fluid connection to a supply reservoir or the like. A bypass line 88 including a valve 90 and a temperature sensor 100 located in the cockpit is connected between lines 82 and 72.

Pump 28 is driven by an electric motor 102 which receives current from a voltage source 104. Motor 102 is controlled by a relay 106 which is, in turn, controlled by a panel switch 108 located in the cockpit. A visual indicator 110 is also located in the cockpit to indicate operation of the pump motor 102. The pump motor circuit is protected by a fuse 114.

A control or throttle valve 116 is located in main flow line 74 and is controlled by a manual hand operated lever 118 located in the aircraft cockpit. Lever 118 is adjustable by an adjustable stop line control handle 120. Movement of handle 118 to a forward position causes the control valve 116 to open. This movement also causes handle 118 to engage the end of a flexible cable or other connector member 122 which is connected to start a chronometer 124 and to also actuate a counter 126. The count on counter 126 reflects the number of passes that the aircraft has made since the handle 118 will be operated for each pass of the aircraft has made since the handle 118 will be operated for each pass of the aircraft over a discharge area. Both the counter and the chronometer can be actuated manually if desired.

A feed line 128 is connected to flow line 74 intermediate valve 116 and 78. Feed line 128 serves to provide liquid flow to the low volume discharge manifold 24. Line 128 branches into a primary flow line 130 having a number of devices mounted along its length and a bypass line 132. The last two mentioned lines include cut off valves 134 and 136 respectively. Line 130 also includes a filter 138 and a temperature gauge 141. The amount of fluid flowing through line 130 is calculated by a flow meter 140 which includes a register and totalizer assembly 142. A liquid cooling radiator 144 is mounted on line 130 and valves 146 and 148 control the input of fluid thereto. These valves can be automatically operated in response to the temperature of the liquid. An isolating valve 160 is located immediately downstream of radiator 144 and a second valve 162 is located in bypass line 132 as illustrated in the drawing.

A coil assembly 164 is mounted on the downstream portion of line 130 and serves to charge the particles within the line in order to substantially lower the particle propensity for the recombining after ejection from the manifold 24. The elements for controlling the coil assembly include a transformer 166, a fuse 168, switch 170 and an indicator light assembly 172. Line 130 terminates in a central portion of the low volume spray manifold 124. Manifold 124 comprises left and right arms 172 and 174 with the upstream portion of each arm including a filter 176. Manifold 24 incorporates a plurality of spray discharge nozzles 178 along its length for the purpose of discharging spray upon the crop or land area being sprayed. In a similar manner, the high volume spray manifold 22 incorporates a plurality of nozzles 180 along its length.

A return flow line 182 is connected to manifold 24 and has a main return line 184 connected intermediate its midpoint for returning excessive fluid back to the storage reservoir 20. An electrical valve 181 is located on line 184. These lines are illustrated with dashed lines in order to avoid undue complexity of the drawing. A bleed line 185 is connected to pumps 28 and 26 and is in turn connected by a line 186 to reservoir 20 to bleed excessive pressure from both of the pumps.

The system of this invention also includes extremely efficient emergency equipment for performing two distinct operations in accordance with the nature of the emergency. Firstly, an emergency gate 188 is located in the bottom of reservoir 20 and is actuable from the pilot's cockpit by electrical means for releasing the gate to release the contents of the reservoir. Any suitable means can be employed for actuating the gate, however, it has been found that a switch 190 on the upper end of lever 118 is the most convenient and effective method of actuation.

The second emergency system is actuated for immediately ceasing the spraying operation upon detection of a malfunction. This system comprises electrical switch 54 for actuating valve 52. Not only does switch 54 control valve 52, it also is connected to control a line switch for motor 102 and to also actuate brake appplying means in pump 26. Therefore, when emergency switch 54 is actuated, the entire distribution system is immediately shut down.

Moreover, the emergency gate 188 can be operated for dumping forest fire control chemicals such as dendonite or borax in a known manner.

When it is desired to fill reservoir 20 by means of the plane's own power system, switch 108 is closed by the pilot to actuate motor 102. Connector 86 is connected to a source of liquid spray chemical and the actuation of motor 102 causes pump 28 to function. Of course, it is necessary that the proper valves be opened and closed in order for the system to function properly for loading. In this instance, valves 67, 81, 90 and 116 are closed and valve 76 is opened. It should be understood that the control for each of these valves is located within the pilot's cockpit and each is easily accessible for actuation. With the valves in this position, the action of pump 28 serves to inject liquid into reservoir 20 by way of the second feed line 48. When the indicator 38 indicates that the reservoir is full, the pilot then merely deactivates pump 102 and check valve 84 prevents any return flow. Indicator 110 provides a visual indication of the times when the pump 28 and motor 102 are being actuated.

When using the low volume manifold 24, an atomization of about ten microns particle average is required. In order to enable this result, it is necessary that the chemical be thoroughly filtered and all foreign matter removed therefrom. Consequently, filters 176 are located in the manifold per se; moreover, the nozzles 178 in manifold 24 also incorporate small individual filter elements. Another filter 138 is located on line 130 as shown in the drawing. Since the high volume manifold 22 does not require the extreme chemical purity required by the low volume manifold 24, fluid supplied thereto is not filtered as extensively.

Since operation of the low volume manifold 24 necessitates a larger amount of recirculation than does operation of the high volume manifold 22, radiator 144 is built into the circuit for the low volume manifold 24. Liquid can be passed through radiator 144 in controlled amounts by operation of valves 146 and 148 in order to be cooled within the radiator. The cooling system of the radiator prevents bubble formation within the system and greatly enhances the overall effectiveness of operation. The numerous temperature gauges 140, 100 etc. provide visual monitoring of the temperature within the system in order that the operator may be appraised at all times of this important parameter.

The system provided by this invention is extremely versatile in operation in that liquid can be supplied to either manifold from the output of pump 26. For example, liquid from the output line 66 can be diverted into line 120 by closing valve 78 so that the output from pump 26 flows to the low volume manifold 24. On the other hand, the output can be directed into the high volume manifold 22 by closing valves 136 and 134. Similarly, when valve 58 and 70 are completely open and pump 26 is not operable, liquid can be pumped by the low volume electric pump 28 to either of the selected manifolds. The nozzles 180 and 178 differ in size in accordance with their desired different flow characteristics. Obviously, the high volume nozzles will be considerably larger than will the low volume nozzles 178. When the low volume manifold 24 is being employed at high pressure, electrical valve 181 is opened to prevent undue pressure build up within manifold 24.

The operator is able to maintain constant monitoring of the chemical flow through the low volume system by virtue of flow meter 140 and the associated register and totalizer assembly 142. This fact in conjunction with the chronometer and pass counter means 124 and 126 enables optimum operating efficiency for the systems. Any indication of high or low chemical distribution results in an actuation or adjustment of valve 116 to make the system achieve the desired output quantity.

It will, therefore, be seen that the instant invention provides a chemical depositing spray system for spraying crops or other land areas that is extremely versatile in operation.

It is to be understood that only a preferred embodiment of the invention is illustrated.

I claim:

1. An aircraft mounted spraying system comprising a liquid storage reservoir, a slip-stream driven centrifugal pump having an inlet connected to a discharge line from said reservoir, an electrically driven pump also having an inlet connected to said discharge line, each of said pumps having an outlet line connected to a main flow line, a high volume spray discharge manifold system connected to said main flow line, a low volume spray discharge manifold system also connected to said main flow line and including a radiator for cooling the spray fluid, valving means for selectively enabling the pumping of fluid from said reservoir to either of said manifold systems, a feed line connected to said reservoir and selectively connectable to the discharge line of said electrically driven pump, a connector connected to the inlet of said electrically driven pump and connectable to a chemical storage tank so that said electrically driven pump can also serve to fill said reservoir and a flow control means for controlling and selectively varying the amount of liquid pumped to the selected manifod system.

2. The spraying system of claim 1 wherein said low volume spray discharge manifold system includes polarization means for polarizing the spray fluid in said low volume system.

3. The system of claim 2 additionally including a flow meter, register and totalizer system in series with said radiator.

4. The system of claim 3 including plural filters for filtering the spray fluid.

5. The system of claim 2 wherein said discharge line from said reservoir includes an electrically operable valve.

6. The system of claim 5 wherein said low volume spray discharge manifold system includes a radiator for cooling the spray fluid.

7. The spraying system of claim 6 wherein said low volume spray discharge manifold system includes polarization means for polarizing the spray fluid in said low volume system.

8. An aircraft mounted spraying system comprising a storage reservoir for storing spray fluid, an outlet line from said reservoir connected to the inlet of a centrifugal pump, propeller means connected to said pump and mounted for rotation by the slipstream of the aircraft for driving said pump, a second centrifugal pump, an electric motor for driving said second centrifugal pump, a discharge line from said first centrifugal pump connected to a main flow line, a discharge line from said second centrifugal pump connected to said main flow line, an input line connected to the inlet of said second electrical pump and connectable to the outlet of said reservoir, a high volume spray discharge manifold consisting of an elongated manifold member having a plurality of spray nozzles along its length, a low volume spray discharge manifold member consisting of an elongated manifold member having a plurality of low volume discharge nozzles along its length, and including first and second filter means, selectively operable valve means for directing fluid from either of said pumps to either of said manifold means, throttle valve means connected on the main flow line for controlling the flow of spray fluid therethrough, radiator means for cooling the spray fluid directed to said low volume manifold means, polarizing means for polarizing the flow to said low volume manifold means, and pressure return flow lines for relieving excessive pressure in said low volume manifold means and said pump means.

References Cited

UNITED STATES PATENTS

| | | | |
|---|---|---|---|
| 2,504,580 | 4/1950 | Pierson | 239—171 X |
| 2,680,648 | 6/1954 | Price | 239—171 |
| 3,061,247 | 10/1962 | Hyde | 239—171 X |
| 3,339,840 | 9/1967 | Point | 239—3 |

EVERETT W. KIRBY, Primary Examiner

U.S. Cl. X.R.

239—3, 15